(12) United States Patent
Simon

(10) Patent No.: US 7,426,903 B2
(45) Date of Patent: Sep. 23, 2008

(54) BIRD TOY

(76) Inventor: David F. Simon, 2067 Viewpoint Landings Rd., Lakeland, FL (US) 33810

( * ) Notice: Subject to any disclaimer, the term of this patent is extended or adjusted under 35 U.S.C. 154(b) by 13 days.

(21) Appl. No.: 11/357,744

(22) Filed: Feb. 17, 2006

(65) Prior Publication Data

US 2007/0261644 A1    Nov. 15, 2007

(51) Int. Cl.
*A01K 29/00* (2006.01)
*A01K 15/02* (2006.01)

(52) U.S. Cl. .................................. 119/707; 119/702

(58) Field of Classification Search .............. 119/700, 119/702, 707, 708, 467, 468, 459, 51.01, 119/51.03, 52.4, 62, 70, 709, 464; 446/73, 446/475, 489; 222/168; 220/345.1, 345.4, 220/345.2, 345.3, 811; 206/385, 1.5
See application file for complete search history.

(56) References Cited

U.S. PATENT DOCUMENTS

| | | | | |
|---|---|---|---|---|
| 3,399,764 A | * | 9/1968 | Rigor .......................... | 206/1.5 |
| 4,420,076 A | * | 12/1983 | Beveridge et al. ............. | 206/37 |
| 4,591,074 A | * | 5/1986 | Kennings ................ | 222/153.01 |
| 4,971,203 A | * | 11/1990 | Weinstein .................... | 206/536 |
| 5,058,754 A | * | 10/1991 | Hickerson .................... | 215/201 |
| 5,141,129 A | * | 8/1992 | Jennings ..................... | 221/154 |
| 5,620,109 A | * | 4/1997 | Madden .................... | 220/345.4 |

* cited by examiner

*Primary Examiner*—Michael R. Mansen
*Assistant Examiner*—Monica Williams
(74) *Attorney, Agent, or Firm*—John R. Benefiel

(57) ABSTRACT

A bird toy providing activity for a pet bird such as a parrot including an enclosure receiving a slide in which treats can be placed. The slide is retracted into the enclosure to prevent access to the treats and cannot be pulled out until the pet bird rotates one or more predetermined orientations whereat the slide can be pulled out to access the treats. Appendages are provided to enable gripping of the slide and enclosure to allow rotation and pull out of the slide.

9 Claims, 3 Drawing Sheets

BIRD TOY

BACKGROUND OF THE INVENTION

This invention concerns devices for providing activity for pet birds such as parrots. Birds, when confined as in a cage or within an owner's residence, are deprived of most activity such as foraging for food required in its natural state in the wild. This lack of purposeful activity can lead to stress in a confined bird. Toys have been developed to provide amusement and activity for birds, such as described in U.S. Pat. Nos. 5,123,378 and D363,148. Parrots, in particular, are highly intelligent and are capable of surprising feats involving solving puzzles, and can be occupied by puzzles which provide a reward when solved.

It is the object of the present invention to provide a bird toy which involves opening of an enclosure to obtain a treat when opened which will occupy a bird and particularly a parrot for some time but which the bird is capable of being successfully solved so as to provide something resembling natural foraging activity for the bird.

SUMMARY OF THE INVENTION

The above object as well as other objects which will be appreciated upon a reading of the following specification and claims are achieved by a barrel shaped enclosure which slidably receives a tubular slide having an open top and in which treats such as fruit or seeds can be placed. The toy is adapted to be hung from a cage or stand.

The slide is retracted into the enclosure to enclose the treat to prevent access. The slide is locked when rotated to misalign a projecting tooth with a slot in the inside of the enclosure to prevent opening of the slide. The slide can be rotated by the bird by grasping a grip integral with and projecting from the slide face to bring the tooth into alignment with the slot and allow the slide to be pulled out to gain access to the treat. A second grip protrudes forwardly from the exterior of the enclosure which enables the bird to hold the enclosure while turning the slide. The bird can eventually learn to grasp the enclosure grip with a claw and turn the cover with its beak to allow the slide to be opened and enable access to the treat contained therein.

DETAILED DESCRIPTION

Figure 1:
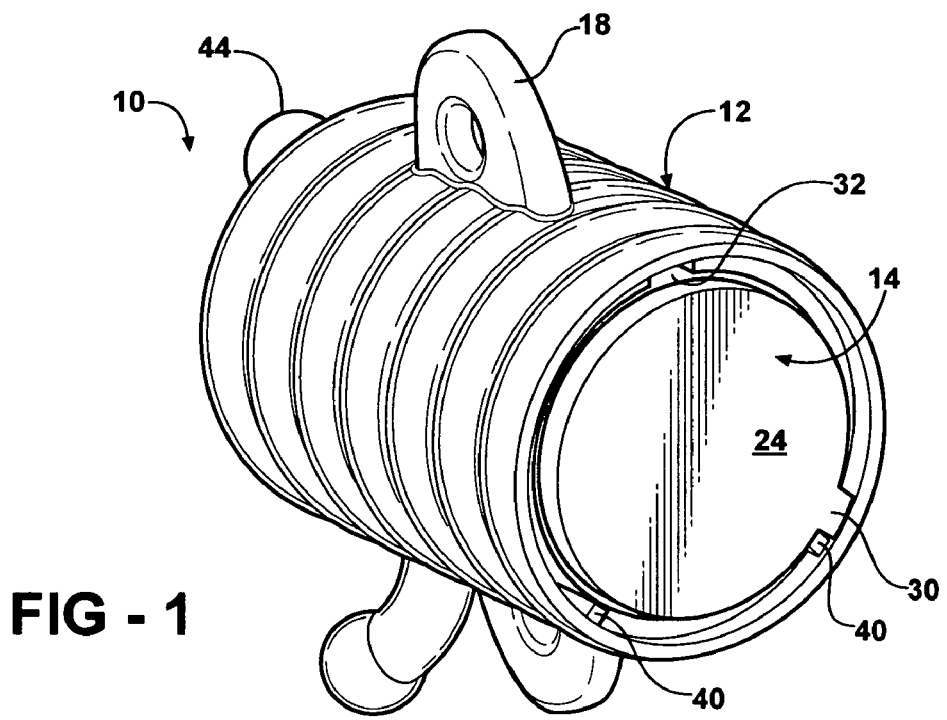
FIG. 1 is an enlarged pictorial view from the rear of a bird toy according to the present invention.
Figure 2:
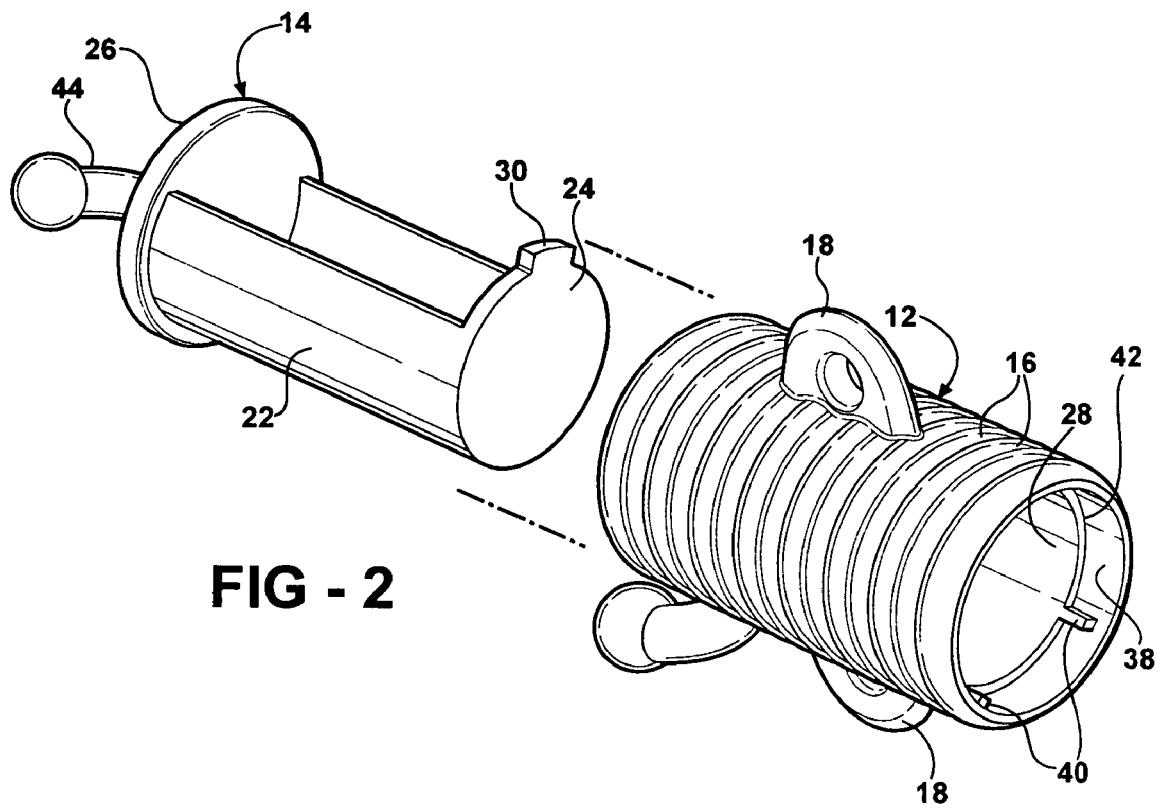
FIG. 2 is an exploded pictorial view of the bird toy shown in FIG. 1.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, the bird toy 10 according to the present invention is comprised of two main parts, a molded plastic tubular enclosure 12 and a molded slide 14 slidable into a cylindrical cavity in the enclosure 12.

Figure 5:
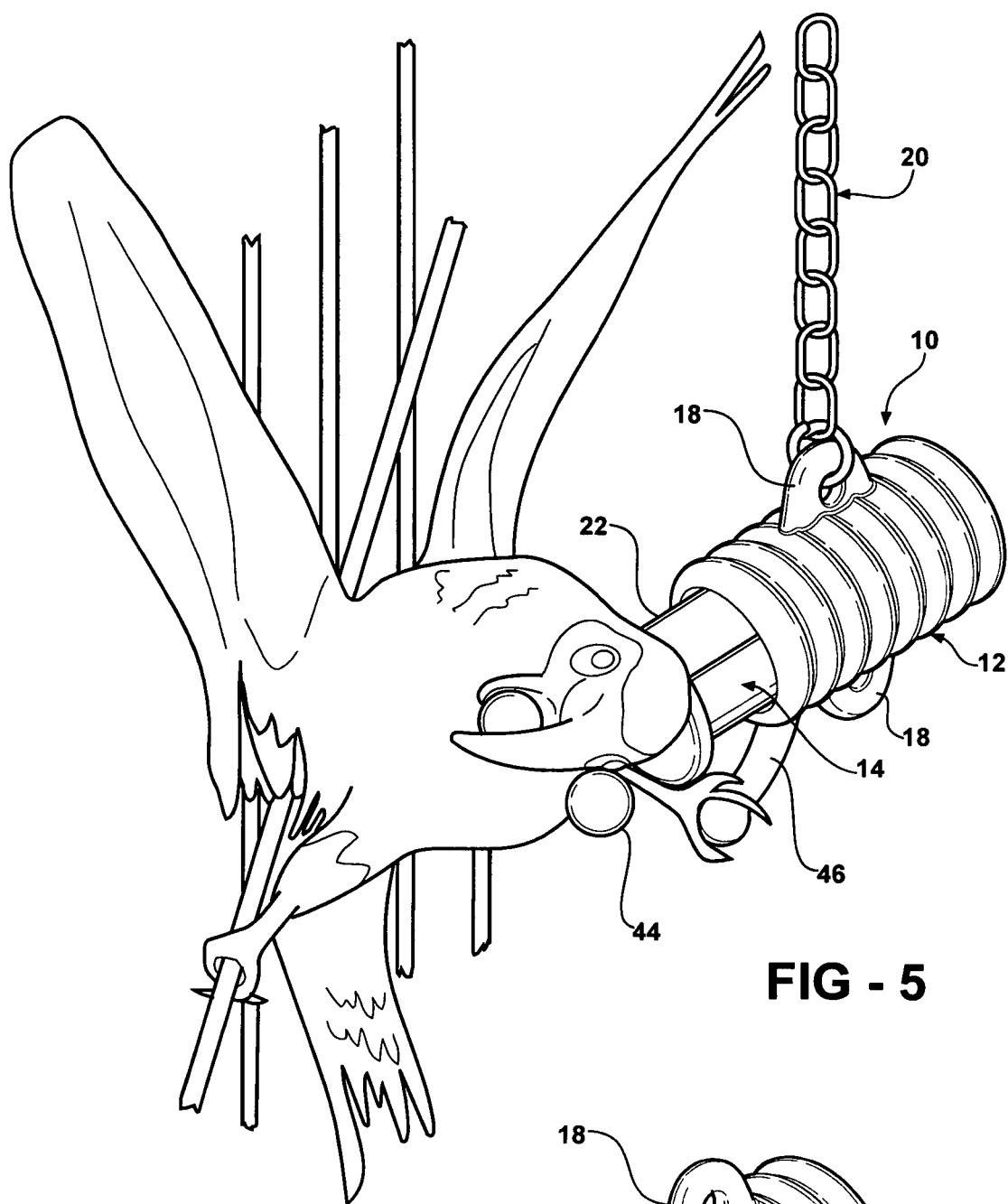
FIG. 5 is a pictorial view of a suspended bird toy according to the present invention which has been opened by a parrot shown grasping the enclosure grip with the claws of one leg and manipulating the slide with its beak.

The tubular enclosure 12 may have ribs 16 molded thereon to present a barrel shape and enable easier gripping by a bird. A pair of oppositely projecting hanging eyes 18 may be formed on the midsection of the enclosure exterior sides for convenient attachment of a hanging chain or strap 20, as seen in FIG. 5.

The tubular slide 14 has an open topped partially tubular portion 22 able to receive and contain treats such as seeds, fruits, etc. A circular rear end wall 24 closes off the rear end of the slide 14 while a larger diameter front face 26 closes off the front end of the slide 14. The front face 26 is sized to abut against the open front end of the enclosure 12 when the slide is fully advanced into the enclosure 12.

The rear end wall 24 is sized to be slidable within the inside diameter 28 of the interior cavity of the enclosure 12. A guide tooth 30 projects from the rear end wall 24 and is slidably fit within a slot 32 extending lengthwise along the inside diameter 28. The slot 32 does not extend all of the way through to the front end of the enclosure 12 but terminates just short of the front end so as to have a solid stop blocking portion 34 at the forward end of the slot 32. This prevents the slide 14 from being pulled out the front end of the enclosure 12.

Figure 3:
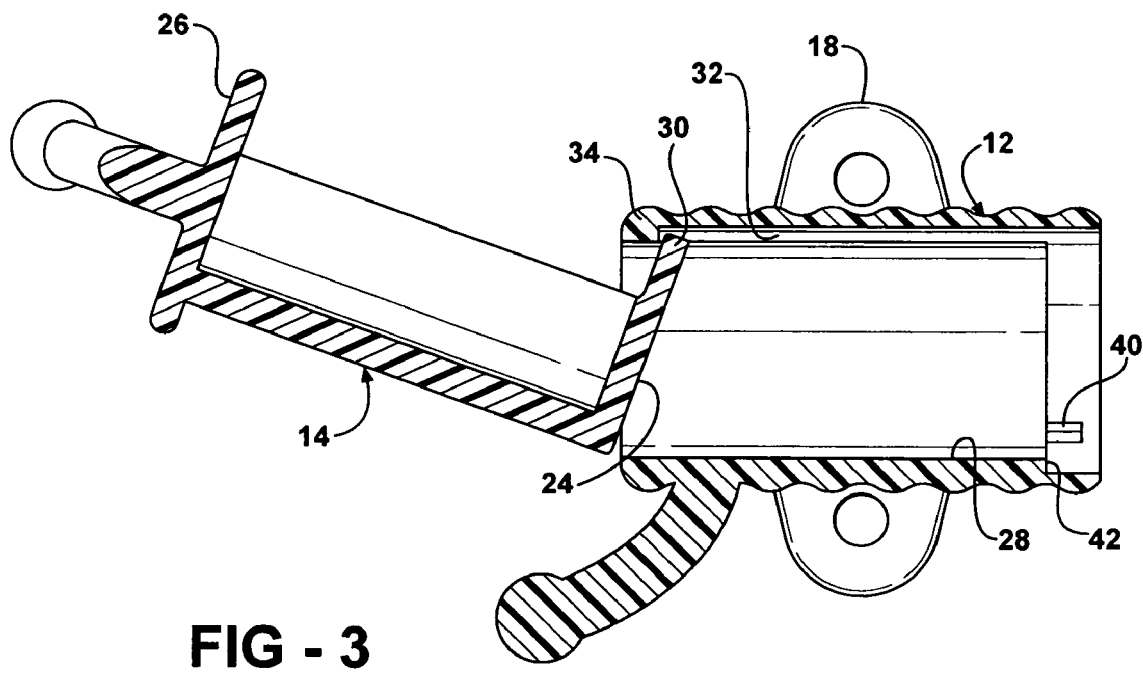
FIG. 3 is a longitudinal sectional view of the enclosure and slide being assembled.

This necessitates tipping the slide 14 as seen in FIG. 3 in order to assemble the slide 14 into the enclosure 12.

Figure 4:
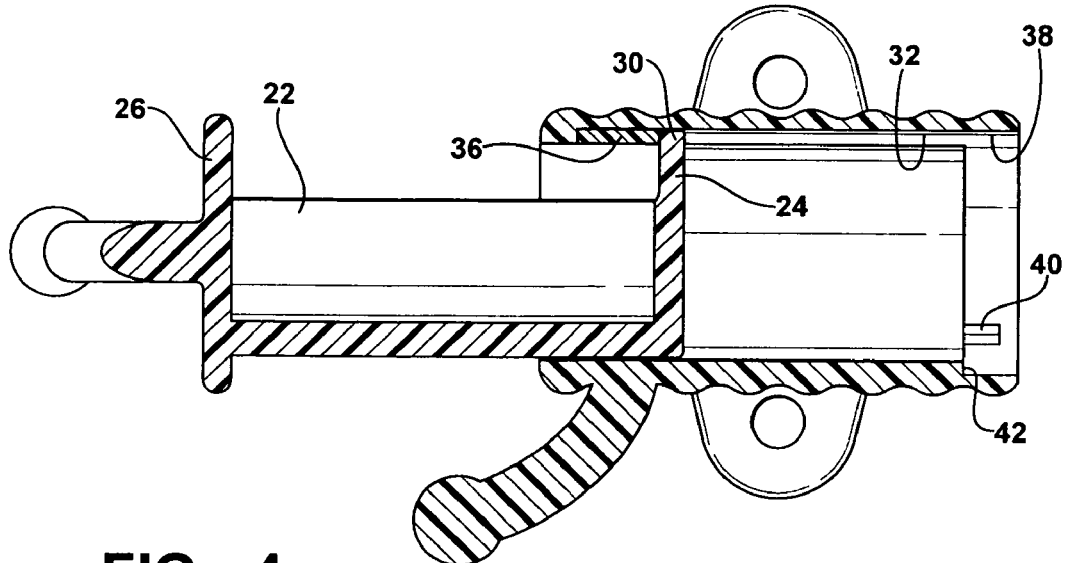
FIG. 4 is a longitudinal sectional view of the assembled enclosures and slide with the slide partially retracted and with a spacer piece installed.

A spacer piece 36 may be glued in place after assembly to prevent removal of the slide 14 by limiting outward sliding to an extent preventing tipping of the slide 14 sufficiently to allow tooth 30 to clear the blocking portion 34 (FIG. 4).

A larger inside diameter 38 at the rear end receives the tooth 30 which moves out of the slot 32 when the slide 14 is pushed completely into the enclosure 12. This allows the slide 14 to be rotated in either direction to bring the tooth 30 against either of a pair of molding in rotary stops 40 (FIG. 1). In this position, the tooth 30 abuts the shoulder 42 formed by inside diameters 28 and 38, preventing the slide 14 from being pulled out and exposing the treats within the partially tubular portion 22.

Figure 5A:
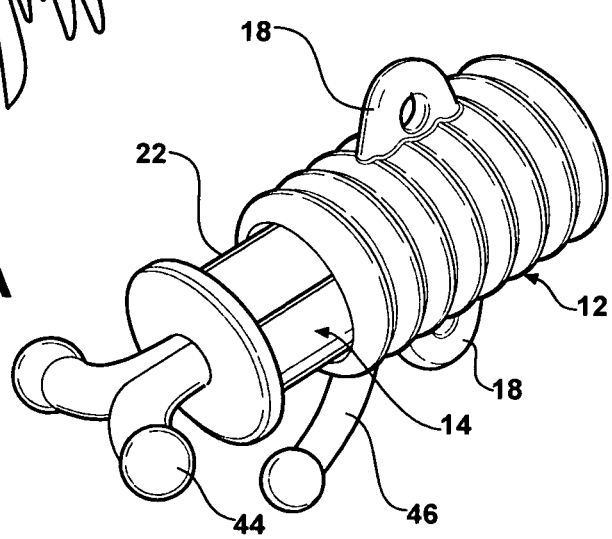
FIG. 5A is a pictorial view of the bird toy shown in FIGS. 1-4, from the front.

The front face 26 has a Y shaped double knobbed appendage 44 projecting out from the outside surface best seen in FIG. 5A.

The enclosure 12 also has an integral knobbed appendage 46 curving up and forwardly from the bottom to be juxtaposed to the Y shaped appendage 44.

As seen in FIG. 5, a bird can grasp the enclosure appendage 46 with one claw to hold it stationary, and engage the other appendage 44 with its beak to allow the slide 14 to be rotated until tooth 34 is again aligned with the slot 32 and pull the slide 14 out to obtain access to the contents. In the slot-tooth aligned orientation, the open topped slide is facing up so that the treats will not spill out of the slide 14. This will eventually be accomplished by random tugging and turning by the bird of the appendage 44 over a period of time.

Parrots in particular are persistent and resourceful enough to able to solve this puzzle in time. This provides extended purposeful activity such as to improve the well being of the pet and reduce the stress typically caused by its confinement.

The toy may be made of a molded plastic of a color such as green to be attractive. The enclosure will typically be several inches long and on the order of an inch and one-half in diameter. Additional slots 32 can be provided to allow pull out of the slide in a plurality of slot-rotated positions in said enclosure to make solution of the "puzzle" easier.

The invention claimed is:

1. A bird toy comprising:
an enclosure defining an interior space;
a slide able to be slidably received into said space though an opening in said enclosure;
said slide being positionable in a retracted position confined within said enclosure with said front face exposed or in a pulled out position slid out to expose the open top and thereby allow access to an opening in a side of said slide;
said slide having a space defined therein exposed through said opening in said side when said slide is moved to said pulled out position;
said front face having a projecting pulling appendage thereon enabling gripping and pulling by a bird as well as turning said slide when in said retracted position within said enclosure;
said slide also being freely rotatable in said enclosure, when in said refracted position; and
blocking portions preventing pull out of said slide except when in one or more selected rotative positions in said enclosure, whereby said toy allows access to treats placed in said slide space to be accessed only when said slide is pulled to said pulled out position, said blocking portions comprised of a tooth radially projecting from said slide and a slot in an inside diameter of said enclosure, said tooth rotatable within an increased diameter space in said enclosure adjacent said inside diameter defining said interior space when said slide is in said retracted position, said slide only able to be pulled out to said pulled out position when said tooth is aligned with said slot.

2. The bird toy according to claim 1 wherein said opening in said slide faces up when said tooth is aligned with said slot.

3. A bird toy comprising:
an enclosure defining an interior space;
a slide able to be slidably received into said space through an opening in said enclosure;
said slide being positionable in a retracted position confined within said enclosure with said front face exposed or in a pulled out position slid out to expose the open top and thereby allow access to an opening in a side of said slide;
said slide having a space defined therein exposed through said opening in said side when said slide is moved to said pulled out position;
said front face having a projecting pulling appendage thereon enabling gripping and pulling by a bird as well as turning said slide when in said retracted position within said enclosure;
said slide also being freely rotatable in said enclosure, when in said retracted position; and
blocking portions preventing pull out of said slide except when in
one or more selected rotative positions in said enclosure, whereby said toy allows access to treats placed in said slide space to be accessed only when said slide is pulled to said pulled out position
said appendage curved and knobbed at a free end thereof enabling rotation and pulling of said slide by a bird.

4. The bird toy according to claim 3 wherein said enclosure is formed with an appendage projecting from a side of said enclosure to enable holding said enclosure by a bird while turning said slide by grasping said appendage on said front face.

5. The bird toy according to claim 3 further including a hanger eye projecting from a side of said enclosure allowing suspension of said toy on a support from its side so that said opening of said slide faces up.

6. A method of providing activity for a pet bird comprising suspending an enclosure adjacent to said bird allowing access and manipulation by said bird;
placing bird treats in a space in a slide able to be slidably and rotatively received in an opening in said enclosure;
pushing said slide to a closed position to be enclosed therein except for an exposed front face to block access to said treats;
providing a pulling appendage projecting from said front face thereon configured to enable gripping by a bird; and
preventing pull out of said slide unless said slide is rotated to one or more particular rotated positions in said enclosure to require said bird to rotate said slide to one of said one or more particular rotated positions and thereafter pull said slide out from said enclosure in order to access said treats.

7. The method according to claim 6 further including providing an appendage on said enclosure to enable gripping of said enclosure by said bird while said bird pulls and rotates said slide.

8. The method according to claim 7 wherein said enclosure is supported by being suspended by a support eye on said enclosure.

9. A bird toy comprising:
an enclosure defining an interior space;
a slide able to be slidably received into said space through an opening in said enclosure;
said slide being positionable in a retracted position confined within said enclosure with said front face exposed or in a pulled out position slid out to expose the open top and thereby allow access to an opening in a side of said slide;
said slide having a space defined therein exposed through said opening in said side when said slide is moved to said pulled out position;
said front face having a projecting pulling appendage thereon enabling gripping and pulling by a bird as well as turning said slide when in said retracted position within said enclosure;
said slide also being freely rotatable in said enclosure, when in said retracted position;
blocking portions preventing pull out of said slide except when in one or more selected rotative positions in said enclosure, whereby said toy allows access to treats placed in said slide space to be accessed only when said slide is pulled to said pulled out position;
said enclosure being tubular and open at each end and said slide comprising a smaller tube slidably received in a main inside diameter section of said tubular enclosure to be enclosed therein in a position of said slide with a face at one end remaining exposed when said slide is in said in position received within said enclosure; said slide having a tooth projecting radially therefrom at an opposite one end comprising a blocking portion and received in a larger diameter section of said enclosure at said opposite end thereof allowing rotation of said slide when in said position enclosed within said enclosure; and
a lengthwise extending radial slot in said main inside diameter extending out into said larger diameter section, said tooth configured to be slidable along said slot when said slide is rotated to a position where said tooth is aligned with said slot but blocked from being pulled out by said main diameter section when said tooth is not aligned with said slot.

* * * * *